(12) United States Patent
Marimuthu et al.

(10) Patent No.: US 11,993,315 B2
(45) Date of Patent: *May 28, 2024

(54) VEHICLE UNDERBELLY STRUCTURE

(71) Applicant: Ameri-Kart Corp., Akron, OH (US)

(72) Inventors: Anandh Raj Marimuthu, Elkhart, IN (US); Joshua A. Parks, Bristol, IN (US); Jeremy R. Delcamp, Bristol, IN (US)

(73) Assignee: Ameri-Kart Corp., Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,927

(22) Filed: Dec. 20, 2022

(65) Prior Publication Data

US 2023/0130431 A1 Apr. 27, 2023

Related U.S. Application Data

(63) Continuation of application No. 17/066,011, filed on Oct. 8, 2020, now Pat. No. 11,541,945.

(60) Provisional application No. 62/940,956, filed on Nov. 27, 2019.

(51) Int. Cl.
*B62D 25/20* (2006.01)
*B60J 11/00* (2006.01)
*B60R 13/08* (2006.01)
*B62D 35/00* (2006.01)

(52) U.S. Cl.
CPC ........... *B62D 25/2072* (2013.01); *B60J 11/00* (2013.01); *B60R 13/0861* (2013.01); *B62D 35/002* (2013.01)

(58) Field of Classification Search
CPC .... B60J 11/00; B60R 13/0815; B60R 13/083; B60R 13/0861; B62D 25/2072; B62D 35/002
USPC ...................... 296/38, 156, 193.07
See application file for complete search history.

(56) References Cited

U.S. PATENT DOCUMENTS

| 8,746,782 | B2 | 6/2014 | Naoi | |
| 11,541,945 | B2* | 1/2023 | Marimuthu | B62D 25/2072 |
| 2020/0086615 | A1* | 3/2020 | Miyano | B62D 25/2072 |
| 2021/0053510 | A1 | 2/2021 | LaRocco | |

FOREIGN PATENT DOCUMENTS

| DE | 102017005025 A1 | 3/2018 |
| DE | 102020131876 A1 | 7/2021 |

* cited by examiner

*Primary Examiner* — Jason S Daniels
(74) *Attorney, Agent, or Firm* — Vorys, Sater, Seymour and Pease LLP; Mark A Watkins

(57) ABSTRACT

A panel has a first edge portion defining a first end of the panel, and a second edge portion defining a second end of the panel. The length of the panel is predetermined for the panel to reach across a vehicle chassis frame in an installed position in which the first edge portion rests on a side beam and the second edge portion rests on an opposite side beam. The panel further has a longitudinal rib. A first end of the rib is located adjacent to, and inboard of, the first edge portion. A second end of the rib is located adjacent to, and inboard of, the second edge portion.

32 Claims, 5 Drawing Sheets

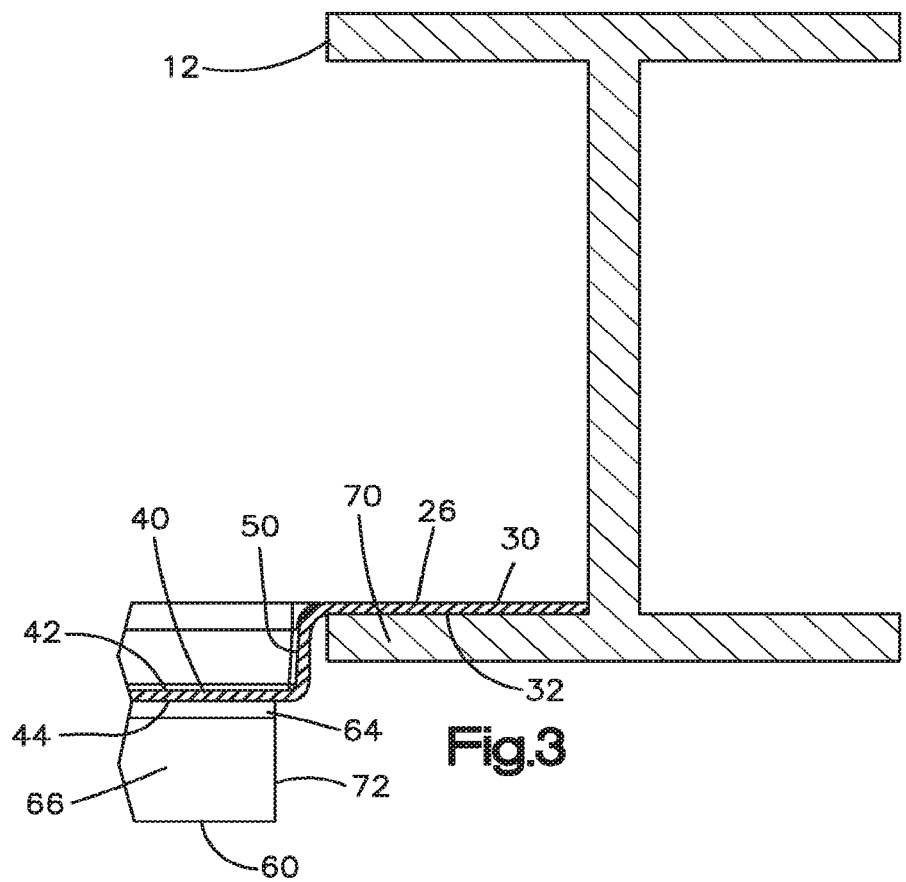
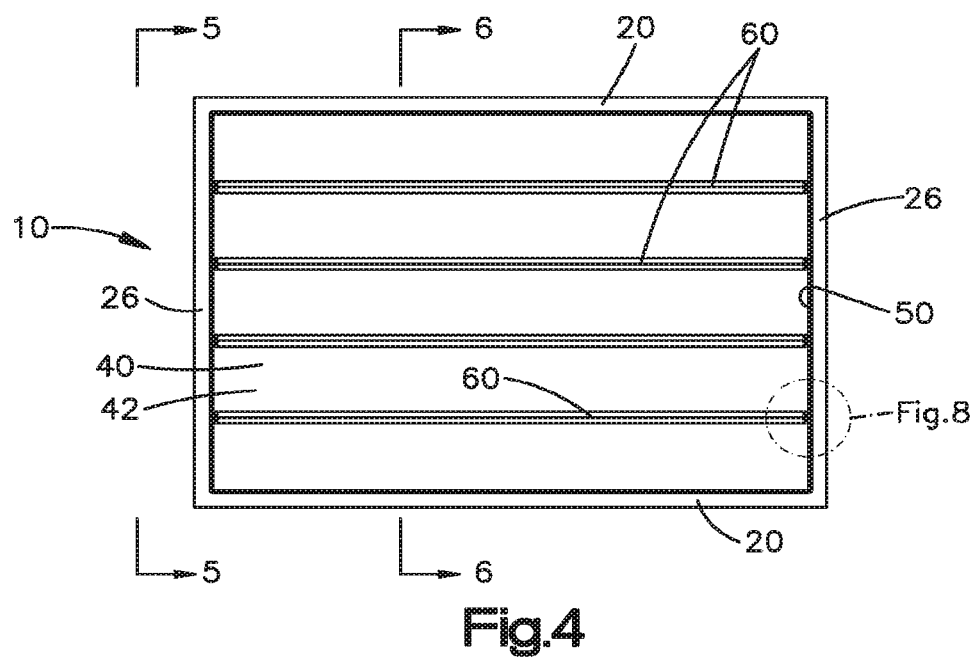

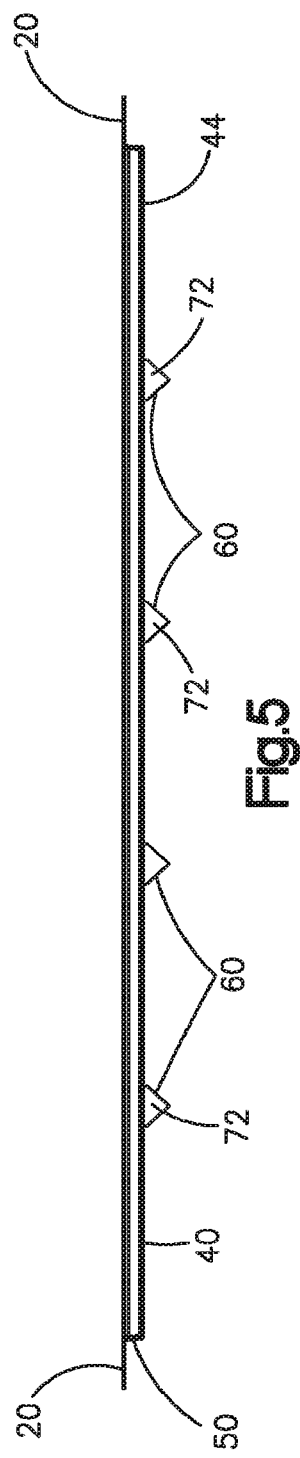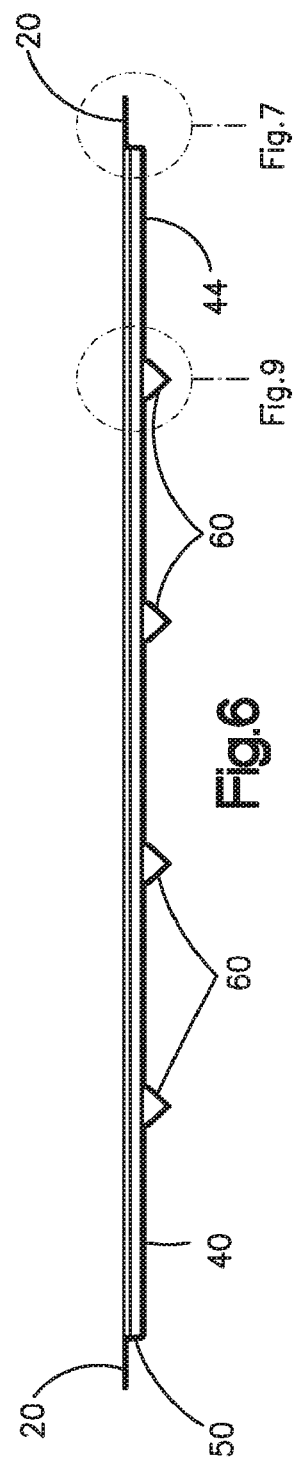

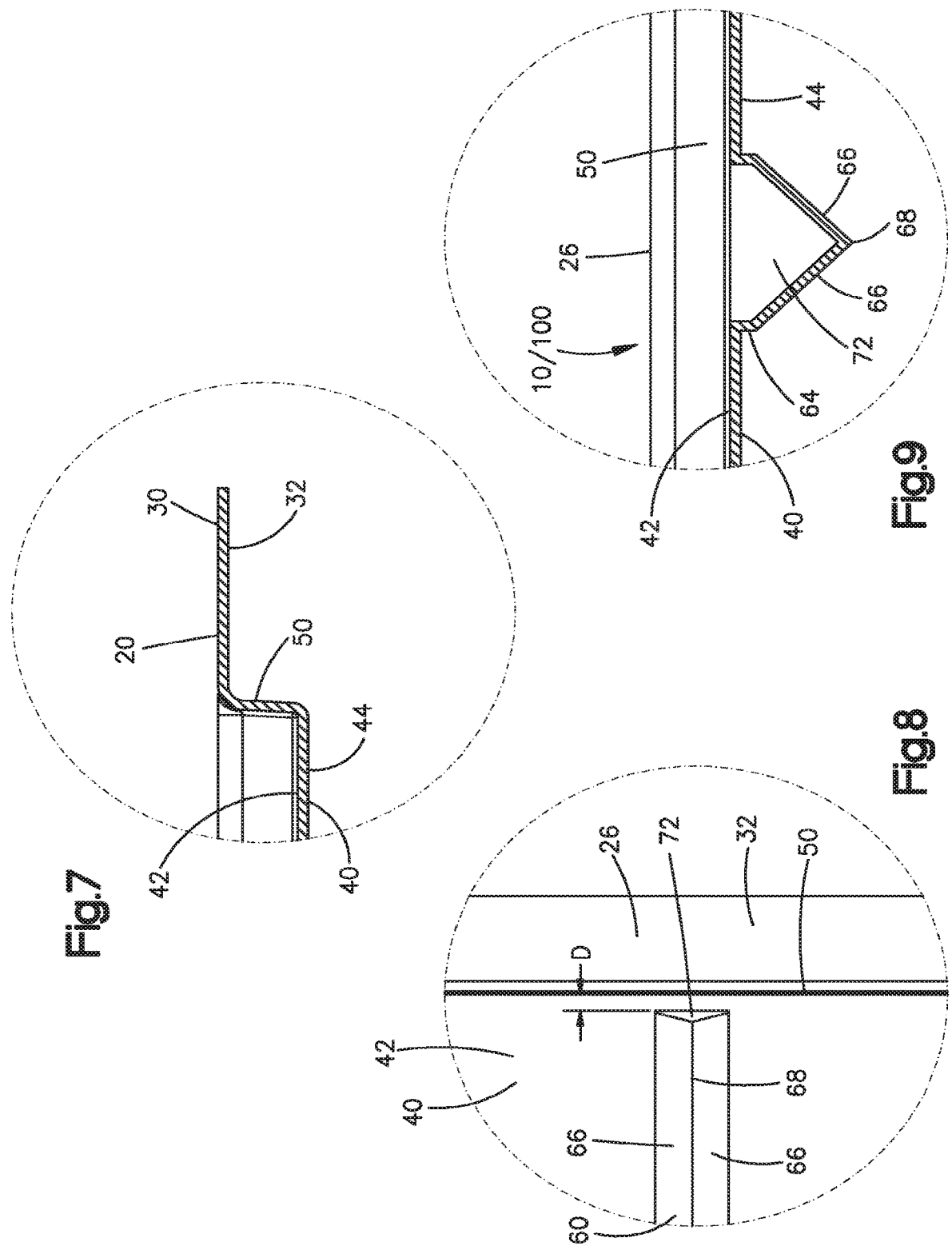

VEHICLE UNDERBELLY STRUCTURE

RELATED APPLICATIONS

This application claims priority of provisional U.S. Patent Application 62/940,956, filed Nov. 27, 2019, which is incorporated by reference.

TECHNICAL FIELD

This technology includes protective panel structures for vehicles.

BACKGROUND

A vehicle may be provided with an underbelly structure to shield the vehicle from environmental factors, debris, air pressure, and the like. For example, a recreational vehicle (RV) may be provided with an underbelly structure to protect components such as water lines and tanks that would otherwise be exposed at the bottom of the RV.

SUMMARY

An apparatus is configured for use with a vehicle chassis frame having first and second side beams spaced apart across the frame. The apparatus includes a panel having a first edge portion defining a first end of the panel, and a second edge portion defining a second end of the panel. The length of the panel is predetermined for the panel to reach across the chassis frame in an installed position in which the first edge portion rests on the first side beam and the second edge portion rests on the second side beam. The panel further has a longitudinal rib. A first end of the rib is located adjacent to, and inboard of, the first edge portion. A second end of the rib is located adjacent to and inboard of the second edge portion.

The rib is located on a major portion of the panel. A peripheral wall portion of the panel projects upward from the major portion. In a first embodiment, the first and second ends of the rib are located inboard of the peripheral wall portion.

In a second embodiment, the major portion of the panel has first longitudinal sections and second longitudinal sections interposed transversely between the first longitudinal sections. Each of the first longitudinal sections includes one or more ribs. Each of the second longitudinal sections has stiffeners reaching transversely across the top of the second longitudinal section between an adjacent pair of the first longitudinal sections.

BRIEF DESCRIPTION OF THE DRAWINGS

FIG. 3 is a sectional view take on line 3-3 of FIG. 2.

FIG. 4 is a top view of the panel of FIG. 1.

FIG. 5 is an end view taken on line 5-5 of FIG. 4.

FIG. 6 is a sectional view taken on line 6-6 of FIG. 4.

FIG. 7 is an enlarged partial sectional view of the panel of FIG. 1.

FIG. 8 is an enlarged partial bottom view of the panel of FIG. 1.

FIG. 9 is an enlarged partial sectional view of the panel of FIG. 1.

DETAILED DESCRIPTION

Figure 1:
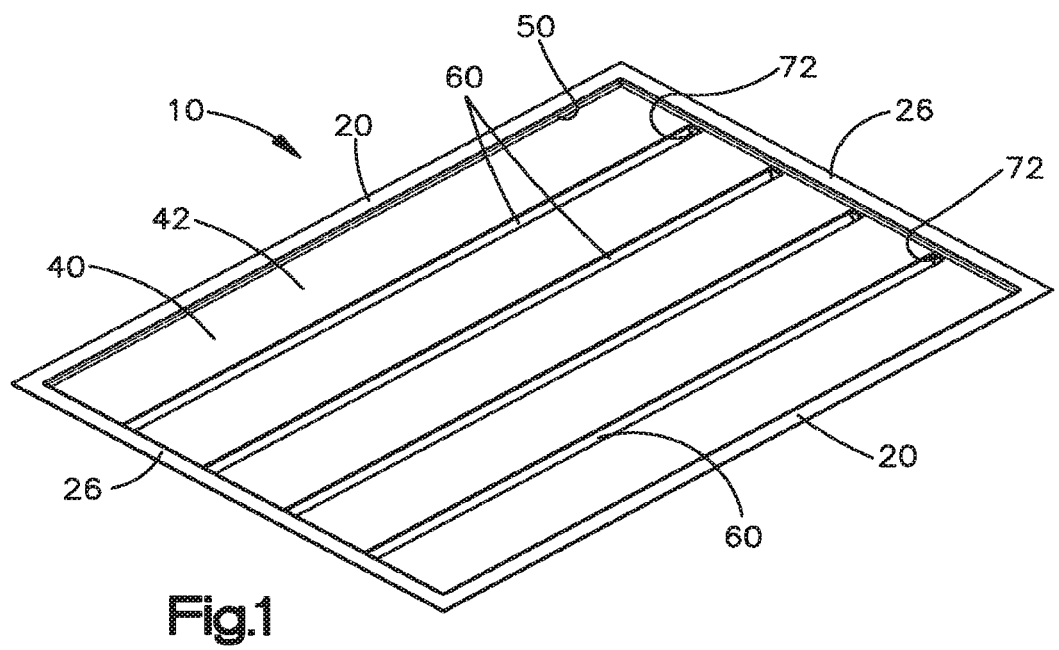
FIG. 1 is a perspective view of a vehicle underbody panel, showing a top side of the panel.

The apparatus illustrated in the drawings has parts that are examples of the elements recited in the claims. The illustrated apparatus thus includes examples of how a person of ordinary skill in the art can make and use the claimed invention. They are described here to provide enablement and best mode without imposing limitations that are not recited in the claims. One or more elements of one embodiment may be used in combination with, or as a substitute for, one or more elements of another as needed for any particular implementation of the claimed invention.

Figure 2:
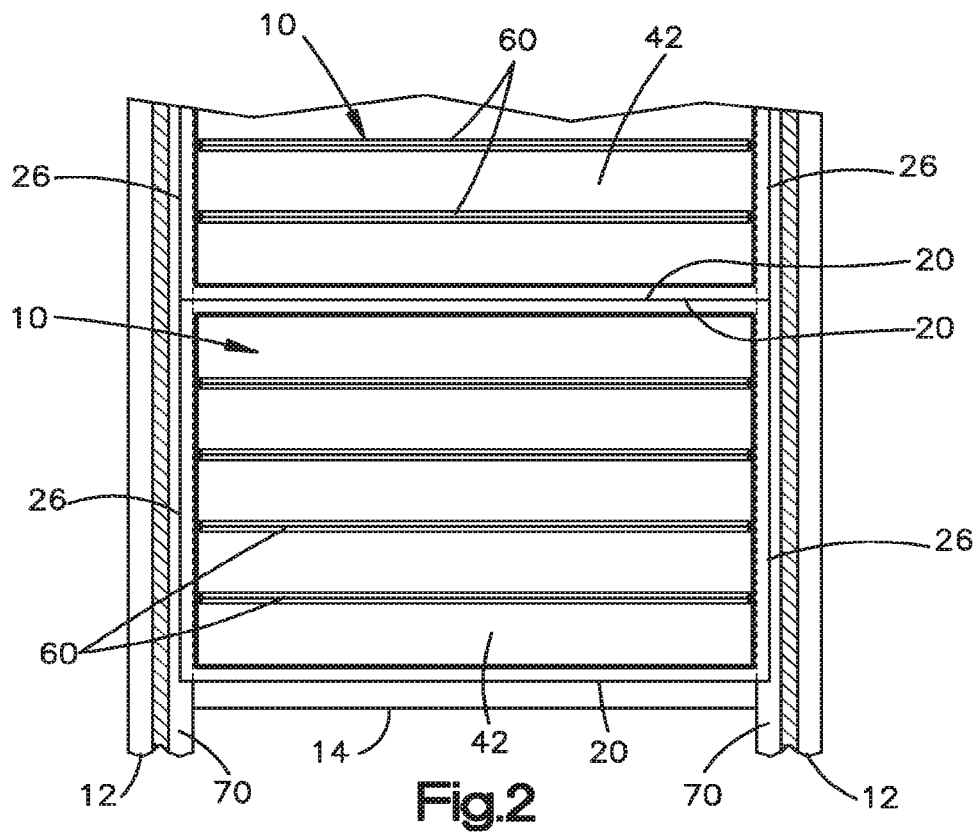
FIG. 2 is a partial plan view of multiple vehicle underbody panels installed on a vehicle chassis frame.

FIG. 1 shows an example of a panel 10 for use in an underbelly structure for a vehicle such as an RV. When installed, the panel 10 is included in the underbelly structure as one of multiple panels 10 that are substantially alike. As shown in FIG. 2, each panel 10 reaches across the underside of the vehicle between opposite side beams 12 in the chassis. The multiple panels 10 are installed side-by-side in a row that reaches lengthwise of the chassis frame between the opposite ends of the vehicle. Adjacent panels 10 can be fastened together at struts 14 that also reach across chassis frame between the opposite side beams 12.

This example of a panel 10 is a single unitary piece of injection molded plastic material. As shown in FIGS. 1 and 4-6, the panel 10 has an elongated rectangular peripheral shape defined by opposite side edge portions 20 reaching between opposite end edge portions 26. As shown in enlarged detail in FIG. 7, each edge portion 20 and 26 of the panel 10 is a flat horizontal lip with a planar upper surface 30 and a planar lower surface 32.

A major portion 40 of the panel 10 also has a rectangular peripheral shape, is oriented horizontally, and has planar upper and lower surfaces 42 and 44. As best shown in FIG. 7, a peripheral wall portion 50 of the panel 10 projects upward from the major portion 40. The edge portions 20 and 26 project horizontally outward from the top of the peripheral wall portion 50.

The planar upper and lower surfaces 42 and 44 of the major portion 40 are interrupted by ribs 60. The ribs 60 reach lengthwise of the panel 10 and, in the given example, are equally spaced apart across the width of the panel 10. These examples of the ribs 60 project downward from the lower surface 44, and are alike.

As best shown in FIGS. 8 and 9, each rib 60 has a pair of vertical side wall portions 64 that are spaced apart across a width of the rib 60. The side wall portions 64 are parallel and reach throughout the length of the rib 60.

Each rib 60 further has a pair of flat, inclined wall portions 66. The inclined wall portions 66 converge from the side wall portions 64 to a peak 68 at which they intersect. In the illustrated example, the side wall portions 66 intersect at an internal angle not greater than 90 degrees, and preferably at an internal angle equal to or substantially equal to 90 degrees. As best shown in FIG. 8, each end of a rib 60 is closed by an end wall portion 72 that is bounded by the side wall portions 64 and the inclined wall portions 66.

As noted above, each panel 10 is configured to reach across the underside of a vehicle between opposite side beams 12 in the chassis. Specifically, the length the panel 10 is predetermined for the panel 10 to reach across a chassis frame in an installed position in which one end edge portion 26 rests on a first side beam 12 and the other end edge portion 26 rests on the opposite side beam 12. As the chassis side beams 12 in the illustrated example are I-beams, the end edge portions 26 are configured to rest on the lower flanges 70 (FIG. 3) at the inboard sides of the I-beams. Accordingly, the ends 72 of the ribs 60 are spaced a distance D (FIG. 6) from the adjacent end edge portions 26 in the inboard direction. This enables the planar lower surfaces 32 at the end edge portions 26 to overlie the I-beam flanges 70 continuously across the width of the panel 10 in the installed position, with the ends 72 of the ribs 60 spaced inboard from the I-beam flanges 70.

Figure 10:
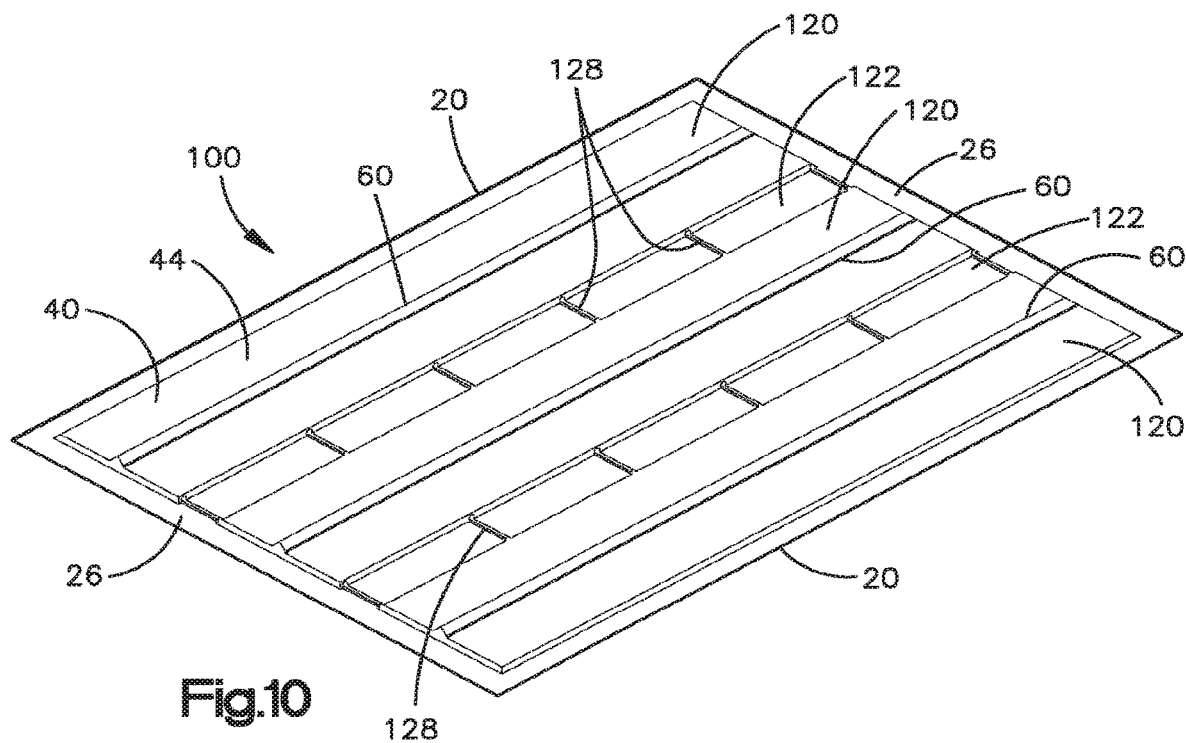
FIG. 10 is a perspective of another vehicle underbody panel, showing a bottom side of the panel.

Another example of a vehicle underbody panel 100 is shown in FIG. 10. This panel 100 has parts that are substantially the same as the panel 10 described above, as indicated by the use of the same reference numbers for such parts. The panel 100 thus has an elongated rectangular peripheral shape defined by opposite side edge portions 20 reaching between opposite end edge portions 26, and is configured to reach across a chassis frame in an installed position in which one end edge portion 26 rests on a first side beam 12 and the other end edge portion 26 rests on the opposite side beam 12.

As in the panel 10, the panel 100 has a major portion 40 with upper and lower surfaces 42 and 44 that are interrupted by ribs 60 reaching lengthwise of the panel 100. The ribs 60 are equally spaced apart across the width of the panel 10, project downward from the lower surface 44, and are alike.

Like the ribs on the panel 10, each rib each rib 60 on the panel 100 has a pair of vertical side wall portions 64 (FIG. 9) that are spaced apart across a width of the rib 60. The side wall portions 64 are parallel and reach throughout the length of the rib 60. Each rib 60 on the panel further has a pair of flat, inclined wall portions 66. The inclined wall portions 66 converge from the side wall portions 64 to a peak 68 at which they intersect. In the illustrated example, the side wall portions 66 intersect at an internal angle equal to or substantially equal to 90 degrees.

Figure 11:
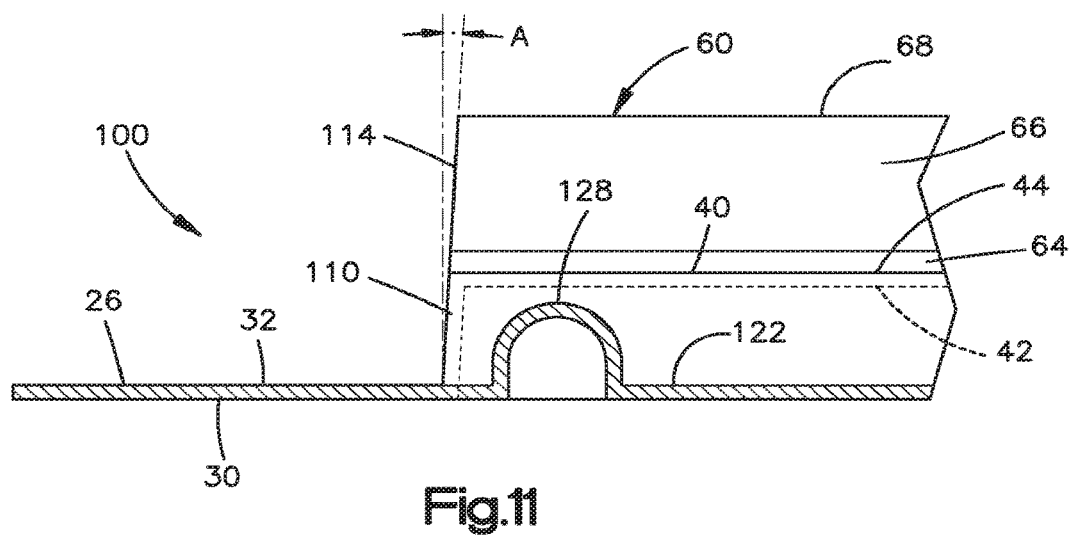
FIG. 11 is an enlarged partial sectional view of the panel of FIG. 10.

As further shown in FIGS. 10 and 11, the panel 100 also has several structural differences from the panel 10. For example, as shown in FIG. 11, the peripheral wall portion 110 of the panel 100 projects from the major portion 40 at a slight angle A that is inclined in the inboard direction. Each rib on the panel 100 has an end wall portion 114 that projects upward from the peripheral wall portion 110 at the same angle. This spaces the end wall portions 114 of the ribs 64 inwardly from the associated side beam flanges in a vehicle chassis.

Other differences from the panel 10 include alternating sections of the panel 100 at the major portion 40. These include first longitudinal sections 120, with second longitudinal sections 122 interposed transversely between the first longitudinal sections 120. Each of the first longitudinal sections 120 includes a respective one of the ribs 64. Each of the second longitudinal sections 122 has stiffeners 128. The stiffeners 128 in the illustrated example reach transversely across the top of the second longitudinal sections 122 between an adjacent pair of the first longitudinal sections 120. The illustrated stiffeners 128 have semi-cylindrical cross sectional shapes as shown in FIG. 11, but may have other shapes such as rectangular or triangular cross-sectional shapes.

This written description sets for the best mode of carrying out the invention, and describes the invention so as to enable a person of ordinary skill in the art to make and use the invention, by presenting examples of the elements recited in the claims. The detailed descriptions of those elements do not impose limitations that are not recited in the claims, either literally or under the doctrine of equivalents.

What is claimed is:

1. An apparatus for use with a vehicle chassis frame including first and second side beams spaced apart across the frame, the apparatus comprising:
    a panel having a first edge portion defining a first end of the panel, a second edge portion defining a second end of the panel, and a length that is predetermined for the panel to reach between the first side beam and the second side beam;
    wherein the panel further comprises a longitudinal rib, the rib comprising a first end adjacent to and inboard of the first edge portion, and the rib further comprises a second end adjacent to and inboard of the second edge portion.

2. An apparatus as defined in claim 1, wherein the panel has a major portion and a peripheral wall portion projecting upward from the major portion, and the first and second ends of the rib are located inboard of the peripheral wall portion.

3. An apparatus as defined in claim 2, wherein the rib projects downward at a lower side of the major portion.

4. An apparatus as defined in claim 2, wherein the first and second edge portions of the panel project from the peripheral wall portion in opposite outboard directions.

5. An apparatus as defined in claim 1, wherein the first edge portion rests on the first side beam and the second edge portion rests on the second side beam when the panel is in an installed position.

6. An apparatus as defined in claim 1, wherein the panel is a unitary piece of material, wherein the material is plastic.

7. An apparatus as defined in claim 6, wherein the material is injection molded.

8. An apparatus as defined in claim 1, wherein the rib has a pair of vertical side wall portions spaced apart across a width of the rib, and has a pair of inclined wall portions converging from the side wall portion to a peak at which the inclined wall portions intersect.

9. An apparatus as defined in claim 8, wherein the inclined wall portions of the rib intersect at an internal angle equal not greater than 90 degrees.

10. An apparatus as defined in claim 8, wherein the inclined wall portions of the rib intersect at an internal angle equal to or substantially equal to 90 degrees.

11. An apparatus as defined in claim 8, wherein the first and second ends of the ribs are closed by end wall portions bounded by the side wall portions and the inclined wall portions.

12. An apparatus as defined in claim 11, wherein the end wall portions are inclined in an inboard direction.

13. An apparatus as defined in claim 2, wherein the major portion of the panel has a pair of first longitudinal sections and a second longitudinal section interposed transversely between the first longitudinal sections, and the second longitudinal section has stiffeners.

14. An apparatus as defined in claim 13, wherein the stiffeners reach transversely between the pair of first longitudinal sections.

15. An apparatus as defined in claim 13, wherein the stiffeners reach transversely across the top of the second longitudinal section.

16. An apparatus as defined in claim 13, wherein the stiffeners have semi-cylindrical cross sectional shapes.

17. An apparatus as defined in claim 13, wherein the stiffeners have rectangular cross sectional shapes.

18. An apparatus as defined in claim 13, wherein the stiffeners have triangular cross sectional shapes.

19. An apparatus for use with a vehicle chassis frame including first and second side beams spaced apart across the frame, the apparatus comprising:
- a panel having a first edge portion defining a first end of the panel, a second edge portion defining a second end of the panel, and a length that is predetermined for the panel to extend between the first side beam and the second side beam;
- wherein the panel further comprises a plurality of longitudinal ribs, wherein each rib comprises a first end adjacent to and inboard of the first edge portion, and each rib further comprises a second end adjacent to and inboard of the second edge portion; and
- the panel comprises a major portion with first longitudinal sections and second longitudinal sections interposed transversely between the first longitudinal sections, each of the first longitudinal sections includes one or more of the ribs.

20. An apparatus as defined in claim 19, wherein each of the second longitudinal sections comprises at least one stiffener that reach transversely between an adjacent pair of first longitudinal sections.

21. An apparatus as defined in claim 19, wherein each of the second longitudinal sections comprises at least one stiffener that reach transversely across the top of the second longitudinal section.

22. An apparatus as defined in claim 19, wherein each of the second longitudinal sections comprises at least one stiffener with semi-cylindrical cross sectional shapes.

23. An apparatus as defined in claim 19, wherein each of the second longitudinal sections comprises at least one stiffener with rectangular cross sectional shapes.

24. An apparatus as defined in claim 19, wherein each of the second longitudinal sections comprises at least one stiffener with triangular cross sectional shapes.

25. An apparatus as defined in claim 19, wherein the first edge portion rests on the first side beam and the second edge portion rests on the second side beam when the panel is in an installed position.

26. An apparatus as defined in claim 19, wherein the panel is a unitary piece of material, and wherein the material is plastic.

27. An apparatus as defined in claim 19, wherein the panel is a unitary piece of material, and wherein the material is injection molded.

28. An apparatus as defined in claim 19, wherein each rib has a pair of vertical side wall portions spaced apart across a width of the rib, and has a pair of inclined wall portions converging from the side wall portion to a peak at which the inclined wall portions intersect.

29. An apparatus as defined in claim 28, wherein the inclined wall portions of the rib intersect at an internal angle equal not greater than 90 degrees.

30. An apparatus as defined in claim 28, wherein the inclined wall portions of the rib intersect at an internal angle equal to or substantially equal to 90 degrees.

31. An apparatus as defined in claim 28, wherein the first and second ends of the ribs are closed by end wall portions bounded by the side wall portions and the inclined wall portions.

32. An apparatus as defined in claim 31, wherein the end wall portions are inclined in an inboard direction.

* * * * *